United States Patent [19]

Denoyelle et al.

[11] Patent Number: 5,057,918
[45] Date of Patent: Oct. 15, 1991

[54] ARRANGEMENT FOR ENCODING TWO-DIMENSIONAL INFORMATION, GROUPED IN PERIODICAL INFORMATION CLUSTERS USING MOTION VECTOR PROCESSING IN A HYBRID DPCM ENCODER

[75] Inventors: Pascal Denoyelle, Creteil; Mohammad-Rèza Haghiri, Sceaux, both of France

[73] Assignee: U.S. Philips Corporation, New York, N.Y.

[21] Appl. No.: 578,984

[22] Filed: Sep. 6, 1990

[30] Foreign Application Priority Data

Sep. 15, 1989 [FR] France .................. 89 12115
Sep. 15, 1989 [FR] France .................. 89 12116
Sep. 15, 1989 [FR] France .................. 89 12117

[51] Int. Cl.$^5$ .............................................. H04N 7/13
[52] U.S. Cl. ..................................... 358/135; 358/136; 358/133
[58] Field of Search ................ 358/105, 136, 135, 133

[56] References Cited

U.S. PATENT DOCUMENTS

4,683,494 7/1987 Furukawa et al. .................. 358/136
4,941,043 7/1990 Jass ............................... 358/136 X
4,972,260 11/1990 Fujikawa et al. ................... 358/136

Primary Examiner—Victor R. Kostak
Attorney, Agent, or Firm—Michael E. Marion

[57] ABSTRACT

An arrangement for encoding two dimensional information grouped in periodical information clusters, the arrangement being comprised of a variable length encoding stage, reconstruction stage, a movement estimating stage and the prediction stage. The movement estimation stage is adapted to supply from the input signals, movement information related to the movement between input signals of the same row or of opposite rows. The reconstruction stage provides a path for additional processing of the signals when the input signals provide additional information components.

8 Claims, 6 Drawing Sheets

ARRANGEMENT FOR ENCODING TWO-DIMENSIONAL INFORMATION, GROUPED IN PERIODICAL INFORMATION CLUSTERS USING MOTION VECTOR PROCESSING IN A HYBRID DPCM ENCODER

BACKGROUND OF THE INVENTION

The invention relates to an arrangement for encoding two-dimensional information grouped in periodical information clusters of the picture type, which arrangement comprises (a) a variable length encoding stage;

(b) a reconstruction stage coupled to the encoding stage and adapted to carry out on the signals present at its junction point with the encoding stage the inverse operations of those already carried out at the junction point on the input signals of said encoding stage;

(c) a stage for estimating the movement per block bounded within the information clusters; and (d) a stage for prediction based on the output signals of the reconstruction and movement estimation stages.

The invention also relates to an arrangement for decoding signals previously transmitted and/or stored after rate reduction of the original signals, which are representative of two-dimensional information initially grouped in periodical information clusters of the picture type in successively odd and even rows and accompanied by first movement information components related to the relative movement of the information clusters among themselves, having been encoded before transmission and/or storage in an encoding arrangement comprising:

(a) a variable length encoding stage;

(b) a reconstruction stage connected in parallel in the encoding stage and adapted to carry out on the signals present at its junction point with the encoding stage the inverse operations of those already carried out at the junction point on the input signals of the encoding stage;

(c) a stage for estimating the movement by means of limited blocks within the information clusters, adapted to receive a series of input signals of a specific row from the encoding arrangement and first information components relating to the movement between these signals and, with respect to the input signals, being representative of non-transmitted complementary signals of the opposite row, and adapted to supply from these signals and information components second movement information components which in the series of input signals are representative of an input signal which follows a previous input signal;

(d) a stage for prediction based on the output signals of the reconstruction and movement estimation stages;

(e) a stage for selecting from the input signals of the encoding arrangement on the one hand and from the output signals of the prediction stage on the other hand signals to be encoded in the encoding stage;

the decoding arrangement comprising a decoding stage which comprises a series arrangement of a buffer memory, a decoding circuit and a circuit for inverse quantising an orthogonal transform of decoded signals, receiving also signals C and N previously transmitted and/or stored and constituting classification information of blocks in accordance with their contents and normalization information, respectively.

This invention is particularly used in the case where the two-dimensional information represents animated pictures and where a compact disc is used to support this information.

The transmission and/or storage of a very large quantity of information, associated, for example with pictures, generally implies that the signals to be transmitted and/or stored must be compressed, i.e. their number must be reduced at a rate to be defined. The reduction rate is defined inter alia by the fact that a sufficient quantity of signals should be preserved so as not to degrade the general information which they carry, for example, (within the scope of the cited application) by the fact that an acceptable picture quality should be maintained.

The majority of currently known encoding processes for realizing this reduction rate are based on orthogonal transforms of the discrete cosine transform type which enable a rate reduction of the order of 10 to 1. An example of such transforms is described in U.S. Pat. No. 4,394,774. However, this ratio is not sufficient for a number of applications such as, for example, the storage and treatment of images on a compact disc.

Prior European Patent Application No. 90201554.4 in the name of the applicant describes an arrangement for processing signals realizing complementary reduction in a ratio of 2 to 1. This arrangement is adapted to be included in general in a system for transmitting and/or storing signals which are regrouped in periodical clusters such as pictures, which system comprises a transmission stage and, after transmission and/or storage of the signals transmitted on a carrier having a limited passband necessitating the rate reduction treatment, a stage for receiving and/or reading the transmitted and/or stored signals. The relevant processing circuit itself essentially includes the following sub-assemblies:

(a) a sub-assembly for temporal sub-sampling in a specific ratio for supplying in accordance with a first transmission and/or storage mode, referred to as compensated mode, a first series of signals to be transmitted and/or stored at a frequency which is lower than that of the clusters of original signals;

(b) a sub-assembly for estimating the movement between blocks relating to successive periodical clusters for supplying per block a movement information to be transmitted and/or stored, replacing those blocks which are eliminated by said temporal sub-sampling operation;

(c) a reconstruction sub-assembly using movement compensation for supplying on the one hand from those blocks which in the original signals lead to the transmission and/or storage in accordance with the compensated mode and on the other hand from the movement information associated with said blocks replacing the eliminated blocks, the blocks of signals such as they are reconstructed at the reception side as a substitute for the eliminated blocks and from the series of transmitted signals and movement information;

(d) a decision-making sub-assembly for supplying for each block from a comparison involving the original signals and the signals reconstructed after movement compensation, information on choosing or not choosing the compensated mode in accordance with the result of this comparison;

(e) a sub-assembly for fall-back treatment for associating per block with the first series of signals in accordance with a second mode referred to as fall-back mode of transmitting and/or storing as a function of the result of the comparison, replacing the first compensated mode, at least one second series of signals which is synchronous with the first series.

SUMMARY OF THE INVENTION

In one of the illustrative embodiments of the present invention the sub-assembly for temporal sub-sampling operates in a ratio of ½ and is a switch controlled by a frequency which is equal to the average repetition frequency of the input signals (pictures) of the arrangement for processing the signals; and it thus eliminates one out of two pictures in the series of picture signals, for example the even pictures. The sub-assembly for movement estimation thus acts on three successive pictures, for example, $I_1$, $I_2$, $I_3$, for searching the direction of movement with respect to each other and ultimately permitting of reconstructing the non-transmitted pictures. As the signals are generally processed in blocks, the movement estimation sub-assembly more specifically searches the direction of movement for each of these blocks in order to ultimately derive (when receiving and/or when reading the transmitted and/or stored signals) an approximation of different blocks composing the non-transmitted pictures from the movement information thus obtained and from the contents of the two transmitted pictures adjacent to one eliminated picture.

The movement estimation sub-assembly used comprises, for example, two picture memories and a block correlator (such as those described, for example in an article by J. R. Jain and A. K. Jain "Displacement measurement and its application in interframe image coding", IEEE Transactions on Communications vol. Com-29 no. 12, December 1981, pp. 1799 to 1808). The movement estimation by way of the proposed correlation method is used for defining for each block of eliminated pictures (for example $I_2$, $I_4$ in a series of pictures $I_1$, $I_2$, $I_3$, $I_4$, $I_5$ etc. ....) a displacement vector D so that from this value of D an approximation $\hat{I}_2$, $\hat{I}_4$, etc. .... of the eliminated picture can be derived from the half sum of the non-eliminated pictures which surround it in accordance with a relation of the following type, in the case where $I_2$ is to be reconstructed between $I_1$ and $I_3$:

$$\hat{I}_2(X) = (\tfrac{1}{2})(I/1(X-D) + I_3(X+D))$$

where X is the spatial coordinate of the current pixel, $I_1$, $I_2$, $I_3$ are the original pictures, D is the displacement (in pixels) and $\hat{I}_2$ is the searched approximation of the intensity of the pixel X of the current block of the eliminated picture.

Expressed in other terms this movement estimation searches for each block, represented by a current pixel having a spatial coordinate X, a vector D so that the expression:

$\Sigma (DFD(X, D))^2$ for the totality of blocks is minimal. In this expression DFD, which stands for "Displaced Frame Difference", is the approximation error associated with the current block and being equivalent for this block to the sum of the square values of approximation errors for all the pixels of the block. This approximation error is thus expressed by:

$$\Sigma (I_2(X) - (\tfrac{1}{2})(I_3(X+D) + I_1(X-D)))^2,$$

(blocks)

and it is this expression whose minimum value is searched. The selected displacement vector is the one associated with this minimum value after an exhaustive test of all the possible displacement vectors in a search range limited by the horizontal and vertical values $D_x$ and $D_y$, respectively.

In the described processing circuit the normal operation mode is that of movement estimation in blocks which permits an ultimate movement compensation and which is therefore referred to as compensated mode. However, the movement estimation sub-assembly may be faltering (too much noise, too rapid movement causing the circuit to go beyond its operating range, objects moving in opposite directions, etc.) and in such situations the sub-assembly for the fall-back mode becomes operative: the normal operating mode is in this case replaced by a non-compensated mode referred to as fall-back mode.

There are two modifications of this fall-back processing sub-assembly in the described embodiment, namely one without spatial sub-sampling and the other with such a sub-sampling. In the first modification, the fall-back processing sub-assembly comprises a circuit having a delay which is equal to the period of the original signals, followed by a temporal sub-sampling circuit using the same ratio as that of the temporal sub-sampling sub-assembly. In the second modification, the fall-back processing sub-assembly comprises inter alia a spatial sub-sampling sub-assembly which comprises a parallel arrangement of a first and a second spatial sub-sampling channel in the defined ratio, while the spatial sub-sampling frame is independent of the movement and fixed, but for the temporal resolution of the signals. In the second modification the structure of the fall-back processing sub-assembly is equivalent to that of a fall-back processing sub-assembly which comprises in a parallel arrangement with the temporal sub-sampling sub-assembly a spatial sub-sampling sub-assembly which comprises two parallel channels the first of which comprises a first spatial sub-sampling circuit and the second of which comprises a series arrangement of a circuit having a delay of one period of the original signals and a second spatial sub-sampling circuit, the spatial sub-sampling frame being independent of the movement and fixed, but for the temporal resolution of the signals, while the two parallel channels are preceded by a spatial filtering circuit and followed by a switch for selecting at a frequency which is twice as low as that of the original signals alternately one or the other of the outputs of the spatial sub-sampling circuits for supplying from the samples of two successive pictures and at the average frequency of that of the input signals a complete picture obtained by mixing the two previously filtered pictures.

The criterion of failure of the movement estimation sub-assembly is checked by a decision circuit which in parallel ways determines the movement-compensated interpolation error for each block in the case of a compensated mode operation and which similarly determines the error in the case of fall-back mode operation. With reference to these parallel calculations a comparison of the two results leads to a selection of the smallest result and to the supply of information of the corresponding mode for each picture block (indicating whether this block will be transmitted and/or stored in the compensated mode or in the fall-back mode without elimination of one out of two images in the latter case).

The arrangement for processing the signals described in the afore-mentioned application whose essential characteristics have been mentioned by way of a description of its structure and its operation permits of remedying the deficiencies found in the matter of rate reduction with the majority of currently known signal encoding arrangements.

However, by combining the principle of these arrangements such as, for example the arrangement described in the document "Coding television signals . . . " by G. Kummerfeldt, F. May and W. Wolf, AEG Forschungsinstitut Ulm, SPIE, vol. 594, Image Coding, 1985 and particularly in FIG. 2 of this document, which arrangements are now traditional, and the principle of the arrangement described in said Patent Application, it appears that the simplification of processing the signals associated with novel possibilities of rate reduction can be used instead.

It is an object of the invention to provide an arrangement for encoding signals enabling in a simple and economical manner a reduction of the quantity of information to be transmitted, which reduction is larger as compared with the prior-art embodiments.

To this end the invention relates to an encoding arrangement as described in the opening paragraph and is characterized in that (A) the movement estimation stage is adapted to receive a series of input signals of a specific row from said arrangement and first information components relating to the movement between these signals and, with respect to the input signals, being representative of non-transmitted complementary signals of the opposite row, and adapted to supply from these signals and information components, second movement information components which in the series of input signals are representative of an input signal which follows a previous input signal and is supplied to the prediction stage;

(B) the prediction stage is followed by a selection stage for selecting signals to be encoded in the encoding stage from the input signals of the arrangement on the one hand and the output signals of the prediction stage on the other hand;

(C) the reconstruction stage comprises a path for additional processing when the input signals of the arrangement are accompanied by additional information components.

The movement estimators of the conventional type have quite a long calculation time. Thanks to the structure proposed in this application the processing of the signals is simplified because a movement estimation concerning the input signals of the present encoding arrangement has already been realized and because in conformity with the invention new movement information components can be derived from this movement estimation permitting the modification of the processing conditions for encoding in the desired sense by a reduction of the calculation time and hence of the rate.

In a simple and advantageous illustrative embodiment of the present invention the movement estimation stage comprises a first sub-assembly for determining an intermediate vector from said first movement information components, and a second sub-assembly for correcting the value of the intermediate vector, supplying the second movement information components. Each of these first and second sub-assemblies may comprise, for example, a series arrangement of an address circuit, a subtractor, a squarer, a summing device and a comparator.

In another illustrative embodiment according to the invention, the encoding arrangement is characterized in that (A) its input signals are applied to the selection stage via a spatial filtering stage;

(B) the estimation stage is adapted to supply second information components relating to the movement between the input signals of the specific row and the subsequent input signals of the opposite row, and between input signals of specific successive rows.

In this embodiment the encoding arrangement is preferably characterized in that the movement estimation stage comprises a sub-assembly for determining the vector, which sub-assembly comprises in a series arrangement an address circuit a first input of which receives the signals previously processed by the reconstruction stage and a second input of which receives said first movement information components, a subtractor, a squarer, a summing device and a comparator, and in that (a) for determining the second information components relating to the movement between the signals of the specific row and the subsequent signals of the opposite row, the subtractor receives the signals of the opposite row at its second input which is not connected to the address circuit;

(b) for determining the second information components relating to the movement between signals of specific successive rows, a multiply-by-two circuit precedes in series the second input of said address circuit and the subtractor receives the signals of the specific row at its second input which is not connected to said address circuit.

It is another object of the invention to provide a decoding arrangement which is suitable for correctly decoding the signals encoded in accordance with any one of the embodiments of the encoding arrangement according to the invention.

To this end the invention relates to a decoding arrangement as defined in the opening paragraph and is characterized in that it also comprises:

(1) a circuit for reconstructing the information clusters from output signals of the circuit for inverse orthogonal transform and quantifization and from prediction information determined during a preceding reconstruction cycle;

(2) a processing circuit for restoring information clusters in accordance with a grouping similar to the initial grouping;

(3) a prediction circuit for supplying the prediction information from information related to the contents of the reconstructed information clusters and the second movement information components.

In accordance with a first illustrative embodiment this decoding arrangement is characterized in that the initially grouped periodical information clusters are luminance signals of a series of television pictures, in that said processing circuit is a sub-sampling and interpolation stage with or without compensation of movement in accordance with said first movement information components and in accordance with information of modes of operation previously determined as a function of the contents of the initially grouped periodical information clusters, and in that the sub-sampling and interpolation stage is arranged between the output of the reconstruction circuit and the input of the memory circuit.

In accordance with another illustrative embodiment this decoding arrangement is characterized in that the initially grouped periodical information clusters are chrominance signals of a series of television pictures, in that the processing circuit is a circuit for reinterpolating the color difference signals of the chrominance signals and in that a switch for eliminating one out of two reconstructed information clusters is arranged between the output of the reconstruction circuit and the input of the memory circuit.

BRIEF DESCRIPTION OF THE DRAWING

The details and advantages of the invention will now be described in greater detail in the following description and the accompanying drawings given by way of non-limitative example, in which.

DETAILED DESCRIPTION OF THE PREFERRED EMBODIMENTS

Figure 1:
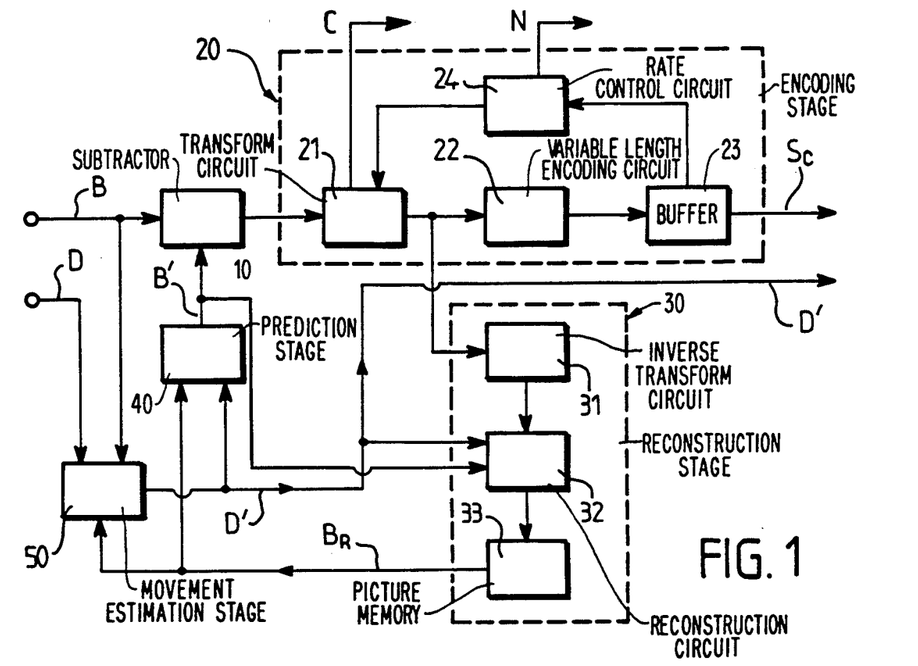
FIG. 1 illustrates a first embodiment of the encoding arrangement according to the invention.

The following description is based on FIG. 1. It will be initially assumed in this description given by way of non-limitative example that series of animated pictures of a non-luminance interlaced form are transmitted and/or registered (comprising 288 rows of 352 pixels per row for each picture) and including the two chrominance components U and V (also 352×288 pixels) at the original frequency of 25 Hz with a desired rate of 1.2 Mbit/sec. It will also be supposed that these original pictures, as far as their luminance component is concerned, are processed in accordance with the principle of sub-sampling described in the afore-mentioned European Patent Application.

For the initial realization of this processing operation, it is necessary to have the disposal of picture blocks classified as compensated blocks or as fall-back blocks for the luminance, dependent on whether they are transmitted and/or stored in accordance with the compensated mode or in accordance with the fall-back mode, and of displacement vectors associated with these blocks. The displacement vectors are associated with each block having dimensions of, for example $p \times q$, of pictures from the even row which are subsequently eliminated (this choice is only given by way of example, and it is also possible to choose to transmit the even pictures and to eliminate the odd pictures). The classification in compensated blocks or in fall-back blocks can be effected on blocks having a size which is different from that of the preceding blocks and is indicated by, for example, $p' \times q'$.

In the particularly interesting case where the signals to be encoded include information which is representative of animated pictures with one or several compact discs as a support for the transmitted and/or stored signals, the best results are obtained when $p=q=p'=q'=8$. But this hypothesis is neither restrictive and the processing operation described below is applicable to other block sizes as well as to other picture formats. It will also be supposed in the embodiment described with reference to FIG. 1 that the information available at the input of the encoding arrangement only consists of movement-compensated blocks and that the case where this information includes fall-back blocks will be generalized.

These input signals, in the case described of a luminance component of the picture signals, correspond to pictures succeeding one another at a frequency of 12.5 Hz and are divided into blocks of $8 \times 8$ pixels and accompanied by displacement vectors D constituting the first movement information components.

The encoding arrangement of FIG. 1 comprises a selection stage, in this case a subtractor 10 whose output is connected to a stage 20 constituting the actual encoding circuit. This encoding circuit itself comprises in this case a circuit 21 for orthogonal transform and quantification (supplying information C of blocks classified in accordance with their activity, generally defined with the aid of thresholds and as a function of subjective tests relating to contrasts having the largest or smallest uniformity, etc.), a variable length encoding circuit 22, a buffer memory 23 supplying the encoded signals $S_C$ with a constant rate and a rate control circuit 24 (supplying normalization information N applied to the circuit 21). Since they are used at the receiving end, the auxiliary information C and N is transmitted during the inverse quantifization and orthogonal transform operations. An example of such an encoding circuit is described in U.S. Pat. No. 4,394,774 or in an even more advantageous embodiment in European Patent Application no. 0,310,175.

The subtractor 10 receives the input signals from the encoding arrangement, which signals are constituted in this case by movement-compensated picture blocks B, and the output signal B' from a prediction stage 40 and the difference between this movement-compensated block B and received as an input signal and the signal B' which is a predicted block as will be further indicated, is applied to the input of the circuit 21 of the encoding stage 20. The encoding stage 20 thus encodes only the difference between these pictures instead of successively encoding all the blocks of a picture $I_1$, then all the blocks of a picture $I_3$, a picture $I_5$, etc. More particularly, this interframe encoding process encodes for each block of pictures the difference between a block B of the current picture $I_3$ and a block B' of the picture $I_1$ which is previously processed and reconstructed, while taking a displacement vector D' between B and B' constituting a second movement information component into account.

The predicted block B' is supplied by the prediction stage 40 which takes the samples of the block corresponding to B, but spatially shifted by the vector D' and referred to as $B_R$ in the reconstructed preceding picture ($I_1$, when the current picture is $I_3$). These reconstructed blocks $B_R$ are supplied in the relevant case by a reconstruction stage 30 comprising in this case in a series arrangement at the output of the quantization and orthogonal transform circuit 21 an inverse quantization and orthogonal transform circuit 31, a circuit 32 for reconstructing the signal which is present before the selection of the signal to be effectively encoded (also receiving the output signal B' from the prediction stage 40 and effecting the operation inverse to that realized by the selection stage 10) and a picture memory 33. The output of this picture memory 33 is connected to the prediction stage 40 so as to supply it with the blocks $B_R$. The vectors D' constituting the second movement information components are supplied by a movement estimation stage 50 operating in the way as described below.

In this case the prediction stage 40 is actually a memory address circuit 33 as a function of the displacement vectors D' supplied by the movement estimation stage 50. This prediction stage may include subsequent to the address circuit a prediction filter particularly intended to improve the prediction and the encoding operation. In the embodiment described the circuit 32 of the reconstruction stage 30 is an adder which is followed by an address circuit for writing the memory 33.

Figure 2A:
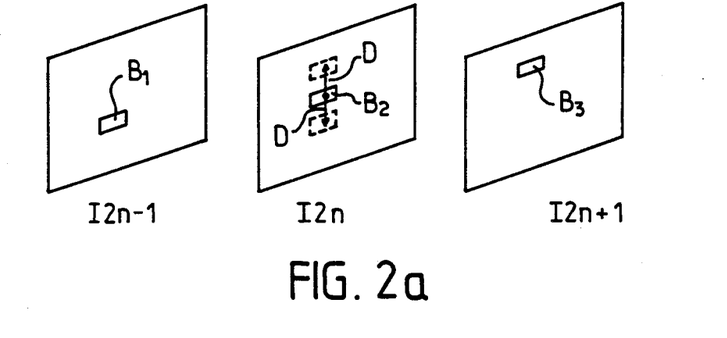
FIG. 2a illustrates for a picture block the principle of interpolation using movement compensation.
Figure 2B:
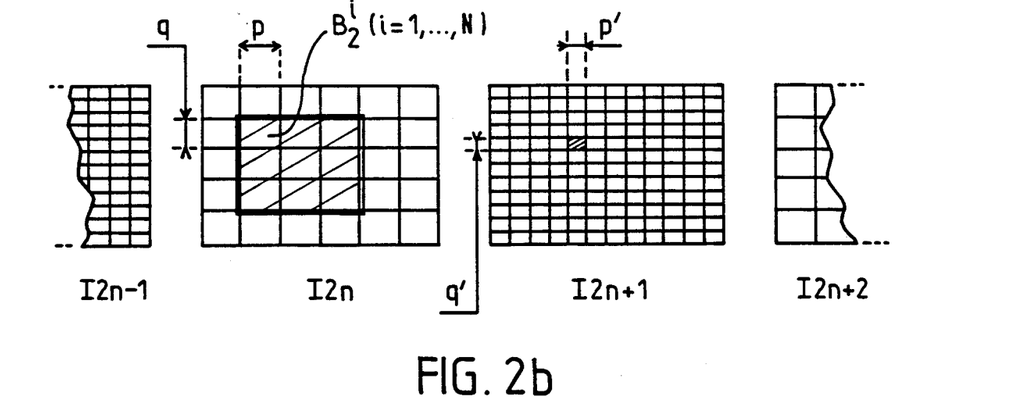
FIG. 2b shows an example of associating neighboring blocks in a non-transmitted picture with a subsequent transmitted picture block.
Figure 2C:
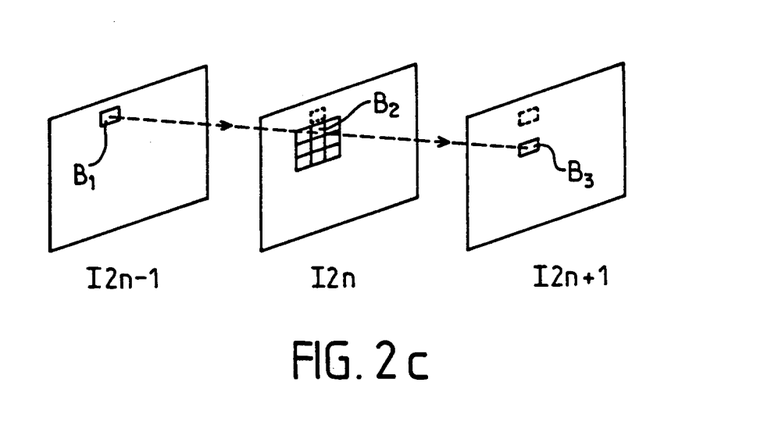
FIG. 2c illustrates the principle of approximate determination of new movement information.

It has been previously noted that a displacement vector D is associated with each block $B_2$ (having a size of, for example p x q) of even pictures $I_2$, $I_4$, etc. which are eliminated (and subsequently interpolated). This vector is represented in the diagram of FIG. 2a by three successive pictures $I_1$, $I_2$, $I_3$ denoted by the reference numerals $I_{2n-1}$, $I_{2n}$, $I_{2n+1}$ for illustrating this principle in a general manner. In the subsequently encoded pictures $I_1$ and $I_3$ (or $I_{2n-1}$ and $I_{2n+1}$) surrounding $I_2$, the corresponding blocks $B_1$ and $B_3$ are shown, taking this vector D into account. When considering a block $B_{2n+1}$ of the size $p' \times q'$, for example $B_3$ in the picture $I_3$ in the transmitted picture to be encoded (see FIG. 2b showing a sequence of pictures $I_{2n-1}$, $I_{2n}$, $I_{2n+1}$, $I_{2n+2}$ in a similar manner), it is possible to associate with this block $B_3$ a neighboring group composed of N blocks $B_{2n}^i$ (for example, $B_2^i$ with i varying between 1 and N) in the cut-out of the picture $I_{2n}(I_2)$ consisting of blocks having a size of p×q (the dimensions of this group of blocks are preferably related to the value of the maximum search range of the displacement vector in the movement estimation sub-assembly of the preprocessing arrangement described in European Patent Application No. 90201554.4). It is thus probable that the displacement vector, denoted as D', which represents the movement of the block $B_3$ (or $B_{2n+1}$) between the picture $I_1$ (or $I_{2n-1}$) and the picture $I_3$ (or $I_{2n+1}$) is almost double that of one of the vectors $D_i$ associated with the blocks $B_2$ or ($B_{2n}$). This conclusion can be drawn with reference to FIG. 2c: this Figure actually illustrates the possibility where the vector D' associated with a block $B_3$ ($B_{2n+1}$) of the picture $I_3$ ($I_{2n+1}$) is equal to 2D, where 2D is the displacement vector associated with a block $B_2$ ($B_{2n}$) of the picture $I_2$ ($I_{2n}$) near the position of the block $B_3$ ($B_{2n+1}$) in the picture $I_2$ ($I_{2n}$), i.e. near the block of $I_2$ ($I_{2n}$) which is accordingly spatial with this block $B_3$ ($B_{2n+1}$).

The movement estimation stage 50 is used for testing each of these vectors $D_i$ and to define the best among them, followed by a correction on this selected vector. The object of this correction is to obtain a better precision with regard to the value of the components of the vector thus selected. If, for example, a selected vector $D_i$ has a known value with a precision of one pixel for each component, all vectors which are double or almost double this vector $D_i$ have a known value with a precision, which is twice as small, of two pixels. This precision can be improved by realizing the proposed correction, in this case ± a pixel for each component.

Figure 3:
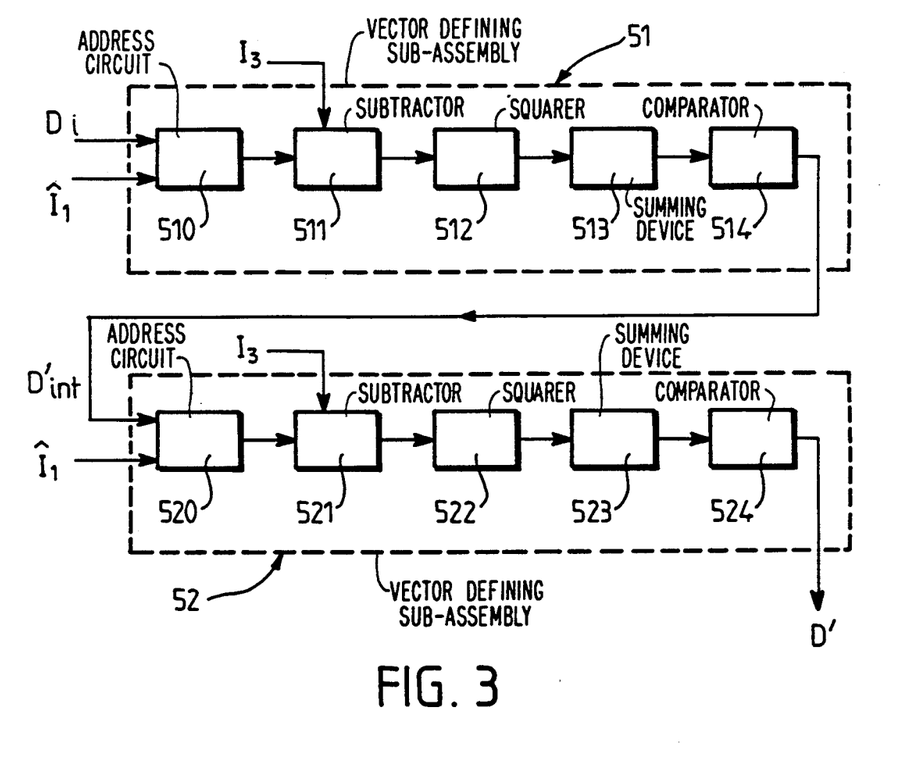
FIG. 3 depicts an embodiment of the movement estimation stage supplying this new movement information.

The stage 50 shown in FIG. 3 comprises a first sub-assembly 51 for defining the vector. This sub-assembly 51 which is used for testing defines those vectors $D_i$ which minimize the expression $\Sigma(I_3(x) - \hat{I}_1(x - 2D_i))^2$ for each block having a size of $p' \times q'$, $I_3(x)$ being the current picture and $\hat{I}_1(x - 2D_i)$ being the reconstructed image shifted by $-2D_i$, and successively comprises:

an address circuit 510 which in the picture memory 33 takes the samples of the reconstructed picture $\hat{I}_1$ corresponding to those of the block $B_3$ and shifted by $(-2D_i)$ for the considered vector $D_i$;

a subtractor 511 which effects the difference between $I_3(x)$, i.e. the current picture and $\hat{I}_1(x - 2D_i)$ which is the reconstructed and shifted picture;

a squarer 512 for the difference thus obtained;

a summing device 513, across the whole block $B_3$, of the differences thus obtained and squared;

a comparator 514 which determines those vectors $D_i$ leading to the smallest result, this selected vector being denoted $D'_{int}$.

Figure 4:
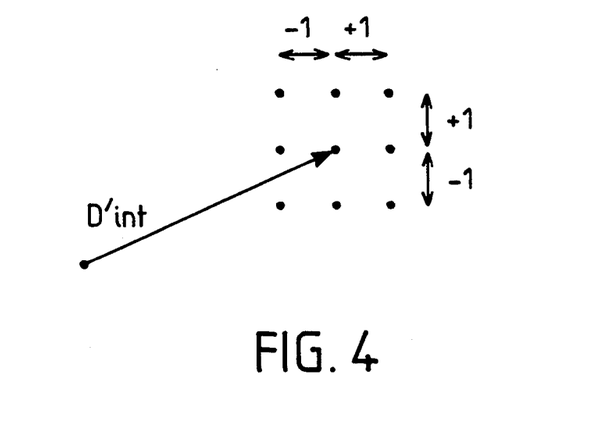
FIG. 4 illustrates the principle of correcting the movement information obtained with reference to said approximate determination.

The stage 50 also comprises a second sub-assembly 52 for correcting the vector. This sub-assembly 52 adapted to effect a correction of ±1 pixel (see FIG. 4) for each component of the vector $D'_{int}$ selected by the sub-assembly 51 successively comprises elements 520 to 524 which are similar to the elements of the sub-assembly 51, except that the address circuit 520 receives the vector $D'_{int}$ instead of the different vectors $D_i$ to be tested, while the nine different possibilities of correcting by ±1 pixel (such as shown in the example in FIG. 4) are applied to this vector. This time the vector D' which is used for effecting the prediction on the block $B_3$ is obtained at the output of the comparator 524 and thus of the movement estimation stage 50.

In general each comparator 514 or 524 compares the results pairwise and selects the smallest result, but it may also ensure the provisional storage of all the results before selecting one of them. Instead of arranging two sub-assemblies 51 and 52 in series, a single sub-assembly could be provided which would first realize the function of defining the vector and then that of correcting the vector thus defined. Such a solution economizes on several circuits but on the other hand it leads to an operation which is a little bit slower. The addressing operation realized by the address circuit(s) is effected in this case in a direct manner on the picture $I_1$ if the precision on the vector D' is one pixel. However, if a better precision, for example, of half a pixel, is searched, the address operation is effected on another picture obtained from the picture $I_1$ by interpolation by a factor which is proportional to the desired supplementary precision.

Figure 5:
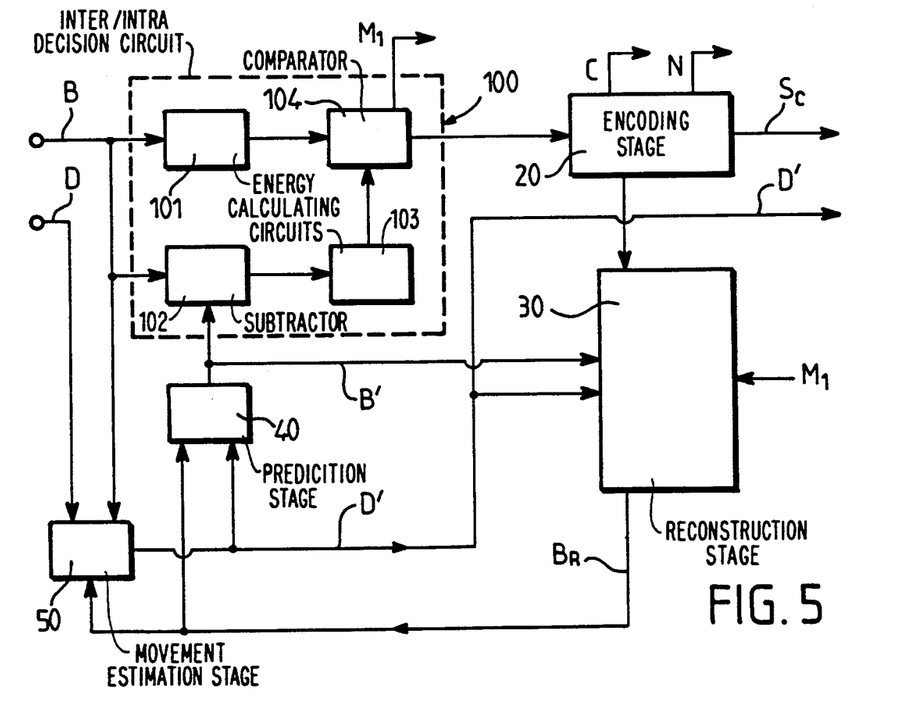
FIGS. 5 and 6 provide two other embodiments of the encoding arrangement according to the invention.

In a second embodiment shown in FIG. 5 of the encoding arrangement according to the invention the selection stage is no longer a simple subtractor 10 but a circuit 100 referred to as an inter/intradecision circuit whose structure and function will be described hereinafter.

This modification is interesting if the encoding of the blocks is to be improved by realizing a processing operation which is different in accordance with the energy contained in the different frequency components of the current signals to be processed. The inter/intradecision circuit 100 comprises a first circuit 101 for calculating the energy contained, for each block B of signals to be processed, in the components other than the DC component. The inter/intradecision circuit 100 also comprises a subtractor 102 which receives the samples corresponding to a current block B and the samples corresponding to the corresponding predicted block B' and which is followed by a second energy calculation circuit 103. This circuit 103 also calculates the energy contained in this block of samples constituted at the output of the subtractor 102 (always without DC component). A comparator 104 receives the output signal of the energy calculation circuits 101 and 103 and selects in accordance with the result of this comparison the one or the other of the two encoding modes referred to as interframe encoding and intraframe encoding (abbreviated inter and intra encoding). In the one or the other case additional information $M_1$ defining the encoding mode is transmitted because it will be necessary at the receiving end for the reconstruction of the pictures. This information $M_1$ is also applied to the circuit for reconstructing the signal 32 of the reconstruction stage 30.

Figure 6:
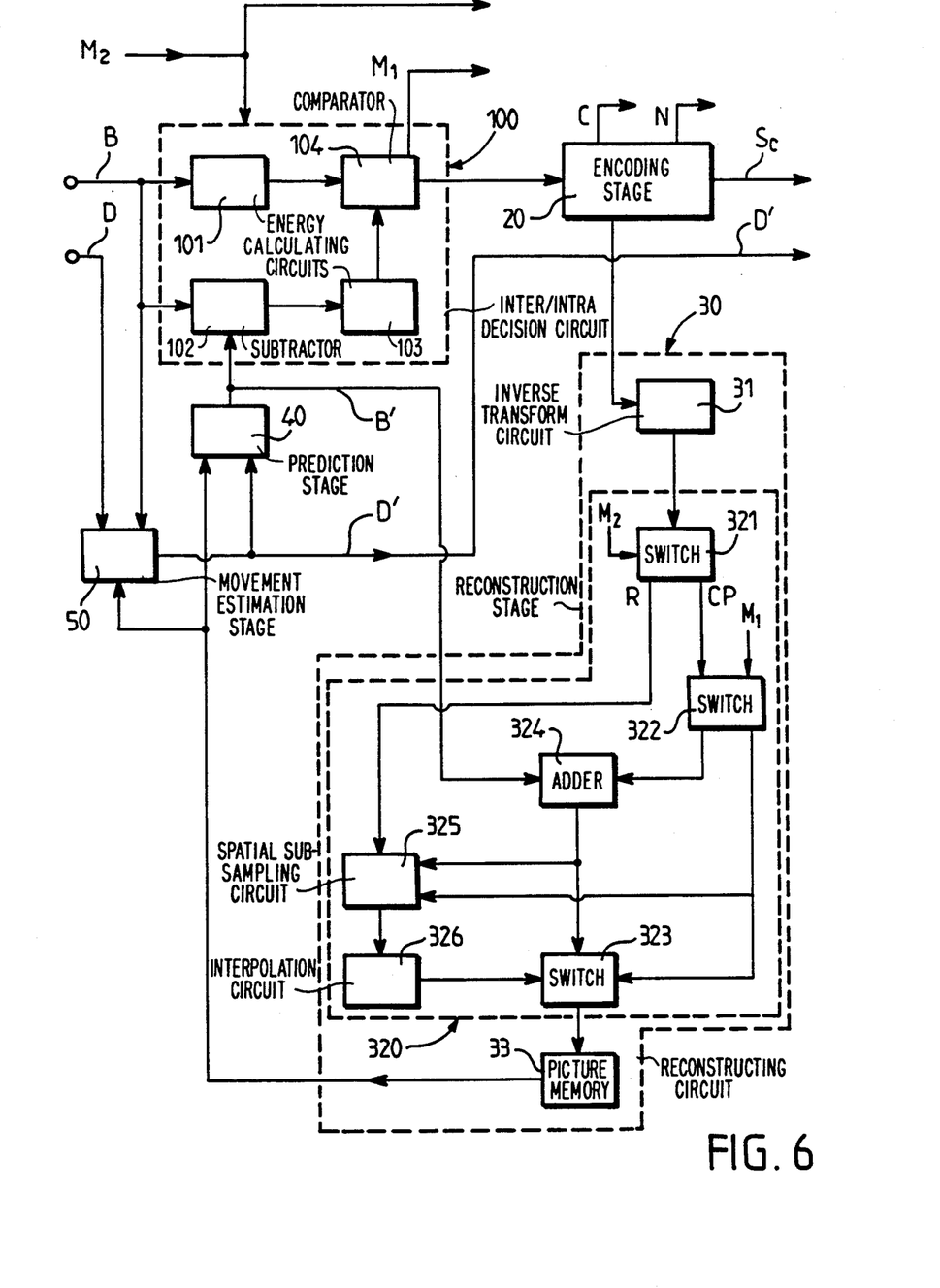

In a third embodiment shown in FIG. 6 the encoding arrangement according to the invention is adapted to the fact that the movement estimation circuit which has enabled the vectors D associated with the input signals B to be obtained may be faltering, as has been noted hereinbefore. In this case the input information of the encoding arrangement no longer relates only to the movement-compensated blocks but it may also relate to fall-back blocks obtained by combining samples of $I_2$ and $I_3$ as indicated in European Patent Application 90201554.4 quoted hereinbefore (fall-back with sub-sampling). Additional information $M_2$ thus accompanies this input information to indicate the nature of the blocks and the operating mode, i.e. the compensated or fall-back mode, by which this information can be obtained. This additional information $M_2$ is transmitted because it will be necessary at the receiving end for the reconstruction of the pictures and it is supplied to the inter/intradecision circuit 100 as well as to the circuit 32 for reconstructing the signal 32 of the reconstruction stage 30.

In this third embodiment the inter/intradecision circuit 100 receives the additional information $M_2$ so that the encoding mode must be the intraframe mode when fall-back blocks are present at the input B of the encoding arrangement. The reconstruction stage 30 is modified in the following manner: at the unchanged output of the circuit 31 for inverse quantifization and orthogonal transform the circuit 32 is replaced by a circuit 320 for reconstructing the signal which is present before selection of the signal to be encoded, while the output of this reconstruction circuit 320 is connected to the memory 33. This reconstruction circuit 320 has a switch 321 controlled by the information $M_2$ for selecting between a compensated mode treatment and a fall-back mode treatment. In the case of compensated mode treatment (denoted as CP) each block can be interframe or intraframe encoded in accordance with the position of a switch 322 receiving the output signal C from the switch 321 and controlled by the information $M_1$. The output signal of this switch 321 is then applied to a switch 323, either directly in the case of intraframe encoding, or via an adder 324 in the case of interframe encoding, which adder receives the output signal of the prediction stage 40 at a second input for adding the signal to the output signal of the switch 322 present at its first input. In the case of fall-back mode treatment (denoted R) a spatial sub-sampling circuit 325 receives the output signal R of the switch 321 for preserving in each fall-back block only the samples which pertain to the current picture to be reconstructed. The compensated mode blocks are sampled in a similar manner, while the intra-output of the switch 322 and the output of the adder 324 are provided by a circuit 325 for this purpose. A circuit 326 then receives the samples which are present at the output of this circuit 325 for effecting the interpolation of the samples which are absent in the fall-back blocks. After this interpolation the output of the circuit 326 is applied to the switch 323 to ensure the reinsertion of the fall-back blocks in the reconstructed picture. The output of the switch 323 at which this reconstructed picture is present is applied to the memory 33.

A fourth embodiment corresponding (in the aforementioned European Patent Application No. 90201554.4) to the case of the fall-back mode without sub-sampling can be proposed. In this case the additional information $M_2$ indicates whether the treated block forms part of an eliminated picture or a transmitted picture and to this end it controls a switch (not shown) in the reconstruction stage 30 arranged at the head of this stage for transmitting only blocks of transmitted pictures to the rest of said stage 30. The blocks of eliminated pictures are encoded but are not reconstructed by the stage 30. As the pictures $I_1$ and $I_3$ are both reconstructed when the treatment of the blocks of the picture $I_2$ commences, the prediction stage 40 can realize its memory addressing in the case of this embodiment in such a way that either a block $B_1$ relating to the preceding picture $I_1$ or a block $B_3$ relating to the subsequent picture $I_3$ is taken, or that use is made again of the one or the other picture by taking a block $B_{13} = \frac{1}{2}(I_1(X-D_{13})+I_3(X+D_{13}))$ where X denotes the pixels of the blocks $B_2$ in the fall-back mode and $D_{13}$ denotes the interpolation vector associated with $B_2$ (which, without being a limitation, may be for example the displacement vector D estimated by the movement estimation circuit described in the afore-mentioned Application).

In the case which will now be described, in which the input signals of the encoding arrangement correspond to the colour difference signals U and V, i.e. to the chrominance component, of the series of animated pictures, said input signals are not necessarily submitted, like the luminance components, to the previous realization of a processing operation leading to a classification of picture blocks in compensated blocks or in fall-back blocks. However, as for the luminance components, it is possible to allow for the fact that movement information D is available simultaneously with the input signals so that an improved encoding arrangement is obtained.

Figure 7:
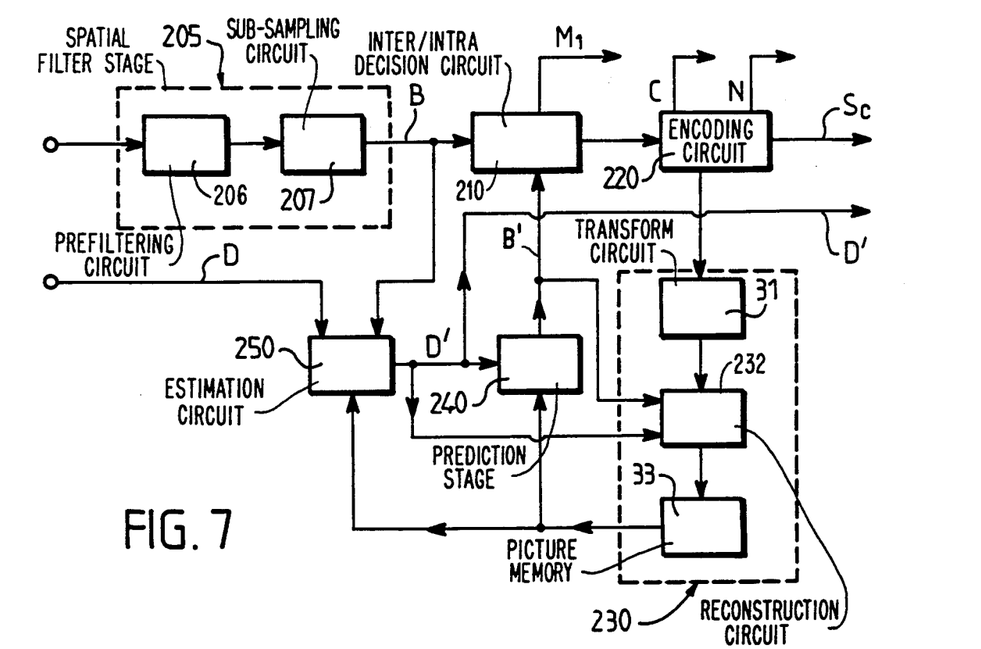
FIG. 7 is another embodiment of the encoding arrangement.

Such an encoding arrangement is shown in a particular embodiment in FIG. 7. The arrangement shown comprises a spatial filter stage 205 for chrominance signals, which stage successively comprises a spatial prefiltering circuit 206 operating separately on the signals U and on the signals V and a spatial sub-sampling circuit 207. As the contents of the chrominance components are smaller at high frequencies than those of the luminance components, a first rate reduction is obtained by means of a spatial sub-sampling of each one of the signals U and V.

Figure 8:
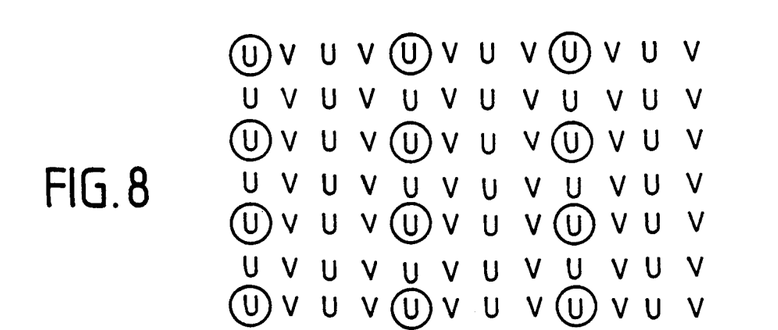
FIG. 8 illustrates in the case of signals U the spatial sub-sampling processing effected on the colour difference signals U and V constituting a chrominance component.

This spatial sub-sampling, in this case by a factor of 4, is shown in FIG. 8, for example, for the signals U but is similar for the signals V. In this FIG. 8 the pixels of the chrominance component have been given the corresponding symbol U or V and those preserved by the sub-sampling operation are encircled. Thus it is found that a block of 4×4 pixels of the signals U (or V in a similar manner) corresponds to a block of 16×8 of luminance components (or eight blocks 4×4), i.e. a block of 8×8 samples U (or V, respectively) covers the same spatial area as a block of 32×16 of luminance components.

More generally, the spatial sub-sampling of the chrominance component causes a chrominance block $B_{chr}$ of p×q samples U (or V, respectively) which must be encoded to correspond to n luminance blocks $B_i$ whose assembly covers the same spatial area. The encoding arrangement thus includes in the case of chrominance a movement estimator adapted to determine for the picture block to be reconstructed which displacement vector can be used for this reconstruction among the assembly of displacement vectors $D_i$ (i varying between 1 and n) associated with said luminance blocks $B_i$. In this case a chrominance picture of the even row denoted $\hat{I}_{chr2}$, $\hat{I}_{chr4}$, etc. is reconstructed with respect to the picture of the opposite row $I_{chr1}$, $I_{chr3}$, etc. which it precedes and a chrominance picture of the odd row, denoted $\hat{I}_{chr3}$, $\hat{I}_{chr5}$, etc. with respect to the picture of the same row $I_{chr1}$, $I_{chr3}$, etc. which it precedes.

The encoding arrangement of FIG. 7 comprises subsequent to the spatial filter stage 205 the selection stage followed by a stage 220 constituting the encoding circuit and being identical to stage 20. In this case the selection stage is an inter/intradecision circuit 210 of the same structure as the circuit 100 in FIGS. 5 and 6. This stage 210 receives the blocks B of the output of the spatial filter stage and the blocks of the output B' of a prediction stage 240 which is identical to stage 40 in FIGS. 1, 5 and 6 and is thus also constituted by a circuit for addressing the output memory of a reconstruction stage 230 which is similar to stage 30. As hereinbefore, stage 210 supplies additional information $M_1$ relating to the inter- or intraframe encoding mode and which is also transmitted because it is required at the receiving end. The memory is addressed as a function of the displacement vectors D' supplied by an estimation stage 250 and constituting, as hereinbefore, the second movement information components. In the reconstruction stage 230 the reconstruction circuit denoted by the reference numeral 232 is situated between an inverse quantification and orthogonal transform circuit 31 and a picture memory 33 and is similar to that of FIG. 6, with the following exceptions:

the absence of classification in compensated blocks and fall-back blocks renders the path including the circuits 321, 325, 326 superfluous and these elements are thus left out so that the output of the circuit 31 is directly connected to the input of the circuit 322;

the switch 323 is no longer necessary and is replaced by a switch functioning in a 12.5 Hz cycle so that only the required pictures are sent to the memory 33, in this case the odd pictures.

Figure 9:
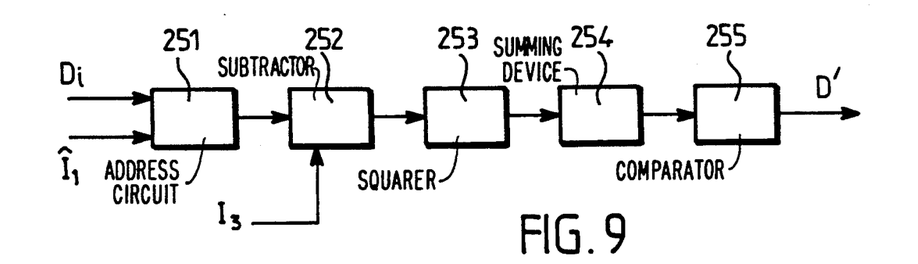
FIG. 9 provides an embodiment of the movement estimation stage of the encoding arrangement of FIG. 7.

The movement estimation stage 250 shown in FIG. 9 comprises a single sub-assembly for determining the vector. Because of the lesser definition and the smaller contents of the chrominance at high frequencies, the correction on the selected vector, realized by the sub-assembly 52 in the case of luminance, is no longer necessary. The vector is determined from the input signals B to be processed and from the signals already processed during the preceding processing cycle, which signals are thus available at the output of the reconstruction stage 230, and is also determined from said first movement information components. This sub-assembly is similar to the sub-assembly 51 described hereinbefore and the movement estimator realises the choice of the vector which minimizes the same criterion as in the case of luminance. These first movement information components are the n vectors $D_i$ associated with n luminance blocks $B_i$ which correspond to the chrominance block considered. The sub-assembly for determining the vector which in this case constitutes the movement estimation stage 250 comprises an address circuit 251 receiving said previously treated signals at a first input, i.e. the blocks $B_R$ from the output of the reconstruction stage 230 (of a picture $\hat{I}_1$), and at a second input the n vectors $D_i$ constituting the first movement information components. The address circuit 251 is followed by a subtractor 252, a squarer 253, a summing device 254 and a comparator 255.

In this case two situations should be distinguished. In the first situation for determining the second movement information components D' relating to the movement between a picture of an odd row and the picture of the even row which it succeeds, for example, between $I_1$ and $I_2$, between $I_3$ and $I_4$, etc., the address circuit 251 directly receives the vectors $D_i$ and the subtractor 252 receives the current signals which at this instant correspond to $I_2$, $I_4$, etc. at its second input which is not connected to the address circuit. However, in the second situation when the stage 251 determines the second movement information components D' relating to the movement between successive pictures of the odd row, for example, between $I_1$ and $I_3$, between $I_3$ and $I_5$, etc. the address circuit 251 this time receives the vectors $D_i$ via a multiply-by-two circuit, which is not shown, while the current signals which are present at the second input of the subtractor 252 now correspond to $I_3$, $I_5$, etc. Thus, in the first case the second movement information components are approximately of the order of magnitude of the first movement information components, whereas in the second case they are approximately of the order of magnitude of twice these first movement information components.

Reciprocally, when the signals are encoded before their transmission and/or storage in the encoding arrangements as has been described herebefore, they must be decoded so that the original signals can be reconstructed.

Figure 10:
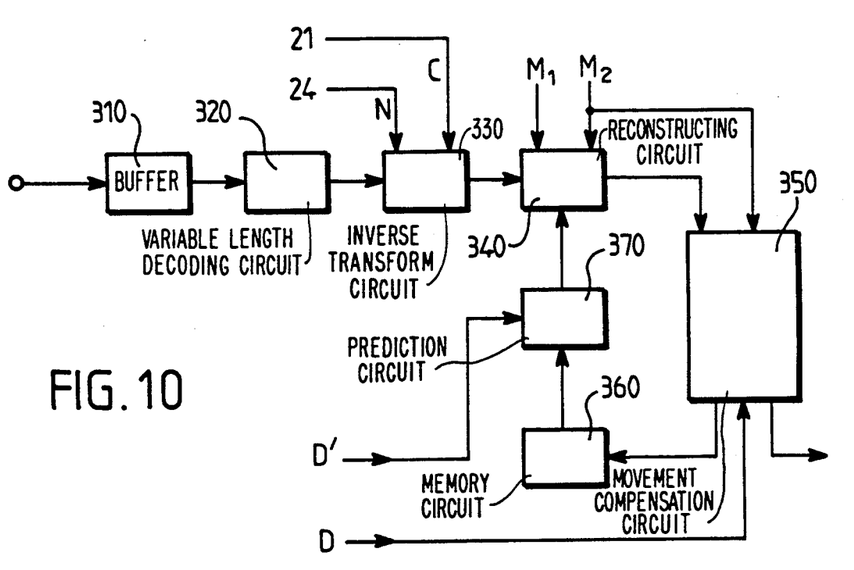
FIGS. 10 and 11 depict two embodiments of a decoding arrangement corresponding to the encoding arrangements of FIG. 6 and FIG. 7, respectively.

In the case where these original signals (at the transmission, before encoding) correspond to the luminance signals of a series of television pictures, an embodiment of the decoding arrangement suitable for this purpose is shown in FIG. 10. In this decoding arrangement the transmitted and/or stored signals are first applied to a buffer memory 310 having a variable length decoding circuit 320 arranged at its output. This circuit 320 provides the quantized coefficients for the different successive blocks, which coefficients are applied to an inverse orthogonal transform and quantifization circuit 330, which inverse quantifization is realised with the aid of a signal of the norm N supplied at the transmitting end by the rate control circuit 24 (see FIGS. 1, 5, 6, 7) and subsequently transmitted and/or stored during the decoding operation which is inverse to the operation at the receiving end.

In the case of sub-sampling preprocessing the decoding arrangement of FIG. 10 comprises a circuit 340 for reconstructing the information clusters from the output signals of the inverse orthogonal transform and quantifization circuit 330 and from the prediction information components previously determined (in the course of a preceding reconstruction cycle), and also the information components $M_1$ (inter- or intraframe encoding) and $M_2$ (compensated or fall-back blocks). The output of this circuit 340 is applied to a memory circuit 360 via a circuit 350 for processing the signals as described in European Patent Application No. 90201554.4. This document describes in FIG. 7 an arrangement which essentially comprises a sub-assembly for movement compensation preceded by a first switch having two inputs receiving the input signals of the arrangement either directly or via a first sub-assembly for sub-sampling and interpolation, and a second sub-assembly for sub-sampling an interpolation preceded by a second switch having two inputs also receiving the input signals of the arrangement either directly or via the series arrangement comprising the first switch—and the two paths which precede it—and the sub-assembly for movement compensation. A third switch controlled like the two preceding switches by the compensated mode or fall-back mode information selects either the output of the sub-assembly for movement compensation or that of the second sub-assembly for sub-sampling and interpolation. A fourth switch finally selects in a cycle which is twice that of the input signals either the output of the third switch or that of the first switch, delayed by one picture period. The two sub-assemblies for sub-sampling and interpolation each successively comprise a spatial sub-sampling circuit and a spatial interpolation circuit adapted to the spatial sub-sampling mode used.

As the circuit 350 supplies the pictures $I_2$ and $I_3$ at the output of the decoding arrangement, it includes a switch (not shown) with which only the picture $I_3$ is applied to the memory circuit 360, which picture is the only one to be stored. For each information cluster such as a picture in the application as described in greater detail and as used in the case of the processing arrangement whose structure has been described above, the signals thus transmitted to the circuit 350 generally comprise partly the reconstructed blocks (corresponding to the compensated mode and encoded either in the inter- or the intraframe mode) and partly the fall-back blocks.

In the case of preprocessing without sub-sampling, the circuit 350 for processing the signals, which is also realised, for example, as described in European Patent Application No. 90201554.4, no longer comprises the sub-assemblies for sub-sampling and interpolation, nor the first and second corresponding switches, and the first and second series of signals are in this case applied to the respective inputs of the sub-assembly for movement compensation and the third switch.

The storage in the memory circuit 360 completes the reconstruction cycle and permits of having the useful signals available for determining said prediction information components and the subsequent reconstruction cycle. These prediction information components are determined in a prediction circuit 370 receiving the output signal of the memory circuit 360 and the second movement information components D', which circuit is in fact a circuit for addressing the circuit 360 when taking the displacements indicated by these information components D' into account.

Figure 11:
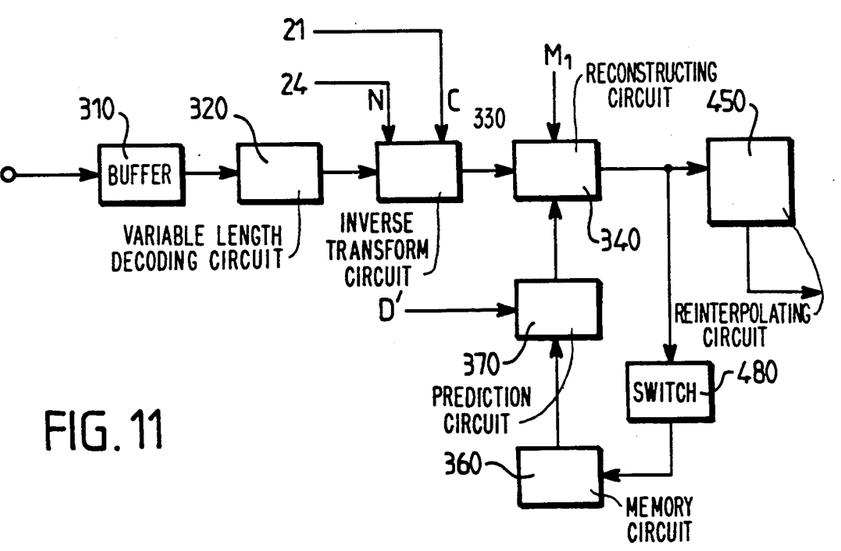

In the case where the original signals (at the transmitter end, before encoding) correspond to the chrominance signals of a series of television pictures, another embodiment of a decoding arrangement is shown in FIG. 11. The circuits 310, 320, 330, 360, 370 in this arrangement are identical to the circuits having the same reference numerals in FIG. 10. The reconstruction circuit 340 is very similar to the previous circuit with the sole difference that in the case of FIG. 11 it does not receive information $M_2$ because in general there is no distinction between compensated or fall-back blocks for the chrominance. The output of this reconstruction circuit 340 is connected to a circuit 450 for reinterpolating the color difference signals whose output is adapted to be connected to a display device and to a switch 480 operating in a 12.5 Hz cycle and arranged between the circuit 340 and the memory circuit 360. This switch 480 is adapted to eliminate one out of two reconstructed information clusters and only selects the one suitable for the prediction in accordance with the same principle of operation as the selection switch for the odd pictures in the reconstruction circuit 232 of FIG. 7.

It should be noted that modifications of the embodiments described hereinbefore are possible. It has been particularly described that the colour difference signals U and V are treated separately, for example, the spatial prefiltering operation carried out by the circuit 206 and the decisions taken by the circuit 210. In contrast, these treatments can be carried out in common on U and V by roughly reconstructing the chrominance component. In this case the test realized by the sub-assembly for determining the vector of the movement estimation stage has also a common function: it is thus carried out by determining that vector $V_i$ which minimizes the following expression instead of the expression given hereinbefore for U and V:

$$\sum_U (I_2(x) - \hat{I}_1(x - D_i))^2 + \sum_V (I_2(x) - \hat{I}_1(x - D_i))^2$$

or the following expression:

$$\sum_U (I_3(x) - \hat{I}_1(x) - 2D_i))^2 + \sum_V (I_3(x) - \hat{I}_1(x - 2D_i))^2$$

in accordance with which one or the other of the two previously defined situations prevails (movement between pictures of odd and even rows, or between pictures of odd rows), while the vectors thus selected are transmitted and/or stored in a manner which is common for U and V.

We claim:

1. An arrangement for encoding two-dimensional information grouped in periodical information clusters of the picture type, which arrangement comprises
   (a) a variable length encoding stage;
   (b) a reconstruction stage coupled to said encoding stage and adapted to carry out on the signals present at its junction point with said encoding stage the inverse operations of those already carried out at said junction point on the input signals of said encoding stage;
   (c) a stage for estimating the movement per block bounded within said information clusters;
   (d) a stage for prediction based on the output signals of said reconstruction and movement estimation stages; said encoding arrangement being characterized in that:
   (A) the movement estimation stage is adapted to receive a series of input signals of a specific row from said arrangement and first information components relating to the movement between said signals and, with respect to said input signals, being representative of non-transmitted complementary signals of the opposite row, and adapted to supply from said signals and information components second movement information components which in said series of input signals are representative of an input signal which follows a previous input signal and is supplied to said prediction stage;

(B) the prediction stage is followed by a selection stage for selecting signals to be encoded in said encoding stage from the input signals of the arrangement on the one hand and the output signals of said prediction stage on the other hand;

(C) the reconstruction stage comprises a path for additional processing when the input signals of the arrangement are accompanied by additional information components.

2. An encoding arrangement as claimed in claim 1, characterized in that the movement estimation stage comprises a first sub-assembly for determining an intermediate vector from said first movement information components, and a second sub-assembly for correcting the value of said intermediate vector, supplying said second movement information components.

3. An encoding arrangement as claimed in claim 2, characterized in that said sub-assemblies for determining the intermediate vector and for correcting said vector each comprise a series arrangement of an address circuit, a subtractor, a squarer, a summing device and a comparator.

4. An encoding arrangement as claimed in claim 1, characterized in that (A) its input signals are applied to the selection stage via a spatial filtering stage;

(B) the estimation stage is adapted to supply second information components relating to the movement between the input signals of the specific row and the subsequent input signals of the opposite row, and between input signals of specific successive rows.

5. An encoding arrangement as claimed in claim 4, characterized in that said movement estimation stage comprises a sub-assembly for determining the vector, which sub-assembly comprises in a series arrangement an address circuit a first input of which receives said signals previously processed by the reconstruction stage and a second input of which receives said first movement information components, a subtractor, a squarer, a summing device and a comparator, and in that (a) for determining the second information components relating to the movement between the signals of the specific row and the subsequent signals of the opposite row, the subtractor receives said signals of the opposite row at its second input which is not connected to the address circuit;

(b) for determining the second information components relating to the movement between signals of specific successive rows, a multiply-by-two circuit precedes in series the second input of said address circuit and the subtractor receives the signals of the specific row at its second input which is not connected to said address circuit.

6. An arrangement for decoding signals previously transmitted and/or stored after rate reduction, said original signals, which are representative of two-dimensional information initially grouped in periodical information clusters of the picture type in successively odd and even rows and accompanied by first movement information components connected to the relative movement of the information clusters among themselves, having been encoded before transmission and/or storage in an encoding arrangement comprising:

(a) a variable length encoding stage;

(b) a reconstruction stage coupled to said the encoding stage and adapted to carry out on the signals present at its junction point with said encoding stage the inverse operations of those already carried out at said junction point on the input signals of said encoding stage;

(c) a stage for estimating the movement by means of limited blocks within said information clusters, adapted to receive a series of input signals of a specific row from said encoding arrangement and first information components relating to the movement between these signals and, with respect to said input signals, being representative of non-transmitted complementary signals of the opposite row, and adapted to supply from these signals and information components second movement information components which in said series of input signals are representative of an input signal which follows a previous input signal;

(d) a stage for prediction based on the output signals of said reconstruction and movement estimation stages;

(e) a stage for selecting from the input signals of the encoding arrangement on the one hand and from the output signals of said prediction stage on the other hand signals to be encoded in said encoding stage; said decoding arrangement comprising a decoding stage which comprises a series arrangement of a buffer memory, a decoding circuit and a circuit for inverse quantizing and orthogonal transform of decoded signals, receiving also signals C and N previously transmitted and/or stored and constituting classification information of blocks in accordance with their contents and normalization information, respectively, characterized in that the arrangement also comprises:

(1) a circuit for reconstructing the information clusters from output signals of said circuit for inverse orthogonal transform and quantifization and from prediction information determined during a preceding reconstruction cycle;

(2) a processing circuit for restoring information clusters in accordance with a grouping similar to said initial grouping;

(3) a prediction circuit for supplying said prediction information from information related to the contents of said reconstructed information clusters and said second movement information components.

7. A decoding arrangement as claimed in claim 6, characterized in that the initially grouped periodical information clusters are luminance signals of a series of television pictures, in that said processing circuit is a sub-sampling and interpolation stage with or without compensation of movement in accordance with said first movement information components and in accordance with information of modes of operation previously determined as a function of the contents of said initially grouped periodical information clusters, and in that said sub-sampling and interpolation stage is arranged between the output of the reconstruction circuit and the input of the memory circuit.

8. A decoding arrangement as claimed in claim 6, characterized in that the initially grouped periodical information clusters are chrominance signals of a series of television pictures, in that said processing circuit is a circuit for reinterpolating the colour difference signals of said chrominance signals and in that a switch for eliminating one out of two reconstructed information clusters is arranged between the output of the reconstruction circuit and the input of the memory circuit.

* * * * *